Patented Nov. 25, 1930

1,782,748

UNITED STATES PATENT OFFICE

IRVING J. SMITH, OF BALTIMORE, MARYLAND

ARTIFICIAL STONE AND METHOD OF MAKING THE SAME

No Drawing.   Application filed February 26, 1927.   Serial No. 171,372.

My invention relates to artificial stone building blocks made by moulding an artificial mixture of materials and allowing the moulded product to harden without the application of heat.

An object of the invention is to obtain a building unit or block which is capable of being worked upon like wood and into which nails or other hard substances may be driven.

A further object is to obtain a block which is relatively light in weight, which is highly resistant to fire, which is practically sound proof and which offers considerable resistance to the penetration of water.

A further object of the invention is to devise a block which is neat in appearance and which is homogeneously hardened, thus making it capable of withstanding considerable shearing stress.

Other objects will be apparent to those skilled in the art from the following disclosure.

It has previously been proposed to employ cinders as a constituent of a building block. Such a block is described in the U. S. patent to Ransome, No. 322,559. The present invention relates to an improvement on the block therein disclosed. It has been found that if cinders are washed prior to mixing them with the other ingredients of the block as suggested in the Ransome patent, the block, when formed is somewhat porous and permeable to water since most of the particles of dust and soluble material have been removed from the cinders. Unless the dust and soluble material is removed, however, the block does not offer sufficient resistance to the penetration of water since, in time the fine particles of material will be dissolved and washed away.

According to this invention, therefore, it is proposed to remove the dust and soluble material and substitute in place thereof suitable material which is not soluble but which will sufficiently fill the space between the larger particles of cinders so as to prevent the block from being porous and aid the cement in causing the particles of cement and cinders to adhere to each other. It has been found that granular calcareous material is suitable for this purpose since it fills the pores and yet is not so hard as to prevent the penetration of a nail in the block.

In carrying out the preferred form of the invention, a quantity of ashes or cinders is washed to remove all the dust and soluble matter. The cinders may then be crushed and screened if necessary to obtain a more uniform size of particles. The washed cinders are then thoroughly saturated with water and mixed while wet with a quantity of filler (preferably calcareous in its nature), Portland cement and sufficient water to make a suitable mixture. The mixture is then moulded in suitable forms and allowed to harden.

The filler used preferably consists of a smooth granular substance, the grains of which will pass through a 10-mesh sieve, having approximately the following analysis, by weight;

Magnesium carbonate ($MgCO_3$) _____ 40%
Calcium carbonate ($CaCO_3$) _____ 59%
Silica ($SiO_2$) _____ Trace This calcareous material, it has been found, although filling substantially all the voids between the larger pieces of cinders, does not prevent a nail from being driven into the block. Other granular substance, as sand may be used, however, without departing from the spirit and scope of this invention, but calcareous material is preferred because it is not so hard as the ordinary silicate sand used in concrete and is thus better adapted to be penetrated by nails.

In mixing the batch, it has been found that the following proportions of materials produce the best results:

|  | Per cent by volume |
|---|---|
| Washed cinders | 70 |
| Calcareous material | 10 |
| Cement | 20 |

It is to be understood, however that the above proportions may be varied widely to obtain different results as to compression strength, hardness, degree of penetration by nails, color, moisture absorption, etc., without departing from the scope of the invention.

The object of thoroughly saturating the cinders with water and mixing them with the filler and cement while wet is to aid in the hardening process of the block. It is well known in the art that setting of cement is due to the presence of water and that the best results are obtained when sufficient water is supplied to keep the cement moist until the hardening process is complete. By means of this process, the clinkers and other ingredients of the cinders absorb and hold large quantities of water. After the block is molded and as the desiccation of the cement gradually takes place, the cinders give up the moisture to the filler and cement by capillary attraction. Thus the entire block is kept moist until the process of hardening is complete. The cement in the block thus obtained is more homogeneously hardened than in ordinary concrete blocks or those employing cinders which are not saturated with water.

The saturation of the cinders is accomplished by mixing the cinders, either by hand or in a mixing machine while adding water until each cinder is wet.

Because of the nature of the filler used the block is highly impervious to moisture and is substantially fireproof. By removing the fine ash dust from the cinders, and using a calcareous filler in place thereof, the binding action between the cinders and filler is such as to give the block more resistance to shearing stress and consequently more resistance to compression stress which depends directly upon the shearing stress as is well known in the art.

It is obvious to those skilled in the art that other ingredients such as coloring matter, animal fiber, lime, sand, etc., might be added to the mixture without departing from the scope of the invention. It is also obvious that any well known cement, whether natural or artificial, might be used instead of Portland cement to secure the binding action.

What I claim as my invention is:

1. As an article of manufacture, a building block, which consists of the hardened product resulting from the mixture of water saturated cinders, of a uniform size, an inert filler, the main ingredient of which is calcium carbonate, cement and water.

2. The herein described method of making artificial stone which consists in selecting suitable quantities of cinders, inert granular calcareous material and cement, washing said cinders to remove the finer particles of ash therefrom, saturating said cinders with water, mixing said cinders while saturated, with said calcareous material and cement, adding sufficient water to make a mixture of suitable consistency, moulding said mixture to the required shape, and allowing said mixture to harden.

IRVING J. SMITH.